(12) United States Patent
Barnett

(10) Patent No.: US 9,277,739 B1
(45) Date of Patent: Mar. 8, 2016

(54) WATER-ACTIVATED BOBBER RELEASE DEVICE

(71) Applicant: Cory P. Barnett, Delavan, IL (US)

(72) Inventor: Cory P. Barnett, Delavan, IL (US)

( * ) Notice: Subject to any disclaimer, the term of this patent is extended or adjusted under 35 U.S.C. 154(b) by 0 days.

(21) Appl. No.: 14/466,370

(22) Filed: Aug. 22, 2014

Related U.S. Application Data

(60) Provisional application No. 61/869,588, filed on Aug. 23, 2013, provisional application No. 62/000,362, filed on May 19, 2014.

(51) Int. Cl.
*A01K 93/02* (2006.01)
*B63B 22/00* (2006.01)

(52) U.S. Cl.
CPC ............... *A01K 93/02* (2013.01); *B63B 22/00* (2013.01)

(58) Field of Classification Search
CPC ..................................................... A01K 93/02
USPC .......................................... 441/8, 23, 2; 43/25
See application file for complete search history.

(56) References Cited

U.S. PATENT DOCUMENTS

| | | | | |
|---|---|---|---|---|
| 2,531,586 A * | 11/1950 | Ramsey | ............... | A01K 97/24 441/8 |
| 2,791,785 A | 5/1957 | Melts | | |
| 3,366,983 A * | 2/1968 | Adams | ............... | B63B 22/10 441/8 |
| 3,685,196 A * | 8/1972 | Scott | ............... | A01K 97/02 43/43.12 |
| 4,126,907 A * | 11/1978 | Fish | ............... | B63B 22/10 43/25 |
| 4,260,075 A * | 4/1981 | Mackal | ............... | B63C 9/18 222/5 |
| 4,527,504 A * | 7/1985 | Byerley | ............... | G08B 21/088 116/209 |
| 4,561,206 A * | 12/1985 | Lowrance | ............... | A01K 91/00 43/42.74 |
| 4,583,314 A * | 4/1986 | Kirkland | ............... | A01K 87/00 43/25 |
| 4,619,066 A * | 10/1986 | Kirkland | ............... | A01K 87/00 43/25 |
| 4,713,031 A * | 12/1987 | Fuller | ............... | A01K 97/00 411/23 |
| 5,203,104 A * | 4/1993 | Brauer | ............... | A01K 87/00 43/23 |
| 5,404,670 A * | 4/1995 | Noll | ............... | A01K 97/06 242/405.1 |
| 5,857,881 A * | 1/1999 | Zippel, Sr. | ............... | B63C 9/15 43/25 |
| 6,705,488 B2 * | 3/2004 | Mackal | ............... | B63C 9/24 222/5 |
| 7,357,689 B2 * | 4/2008 | Campbell | ............... | B63C 9/24 441/95 |
| 7,572,161 B2 | 8/2009 | Mackal | | |
| 8,105,124 B2 * | 1/2012 | Williams | ............... | B63B 22/10 441/7 |
| 2010/0205844 A1 * | 8/2010 | Williams | ............... | F41C 27/00 42/1.01 |
| 2011/0078938 A1 | 4/2011 | Aguzin | | |

* cited by examiner

Primary Examiner — Lars A Olson
Assistant Examiner — Jovon Hayes
(74) *Attorney, Agent, or Firm* — CreatiVenture Law, LLC; Dennis JM Donahue, III

(57) ABSTRACT

A water-activated bobber release device is used to retrieve a submerged item to which it is attached. The device has a housing, a spring, a bobber assembly having a bobber, a spool and a central hole, a bobbin assembly having a framework surrounding a center hole and a dissolvable tablet within the framework, a screw having a flared head engaging the framework and an elongated threaded section extending through the central hole and the center hole, and a fastener connected to the screw holding the spring in compression when the tablet is solidified. The device also has a line wrapped around the spool connecting the bobber assembly to the housing or the item. When submerged in water, the tablet dissolves, and the spring forces the screw's head through the bobbin assembly, thereby jettisoning the bobber assembly from the housing where it is free to float to the surface for retrieval.

22 Claims, 7 Drawing Sheets

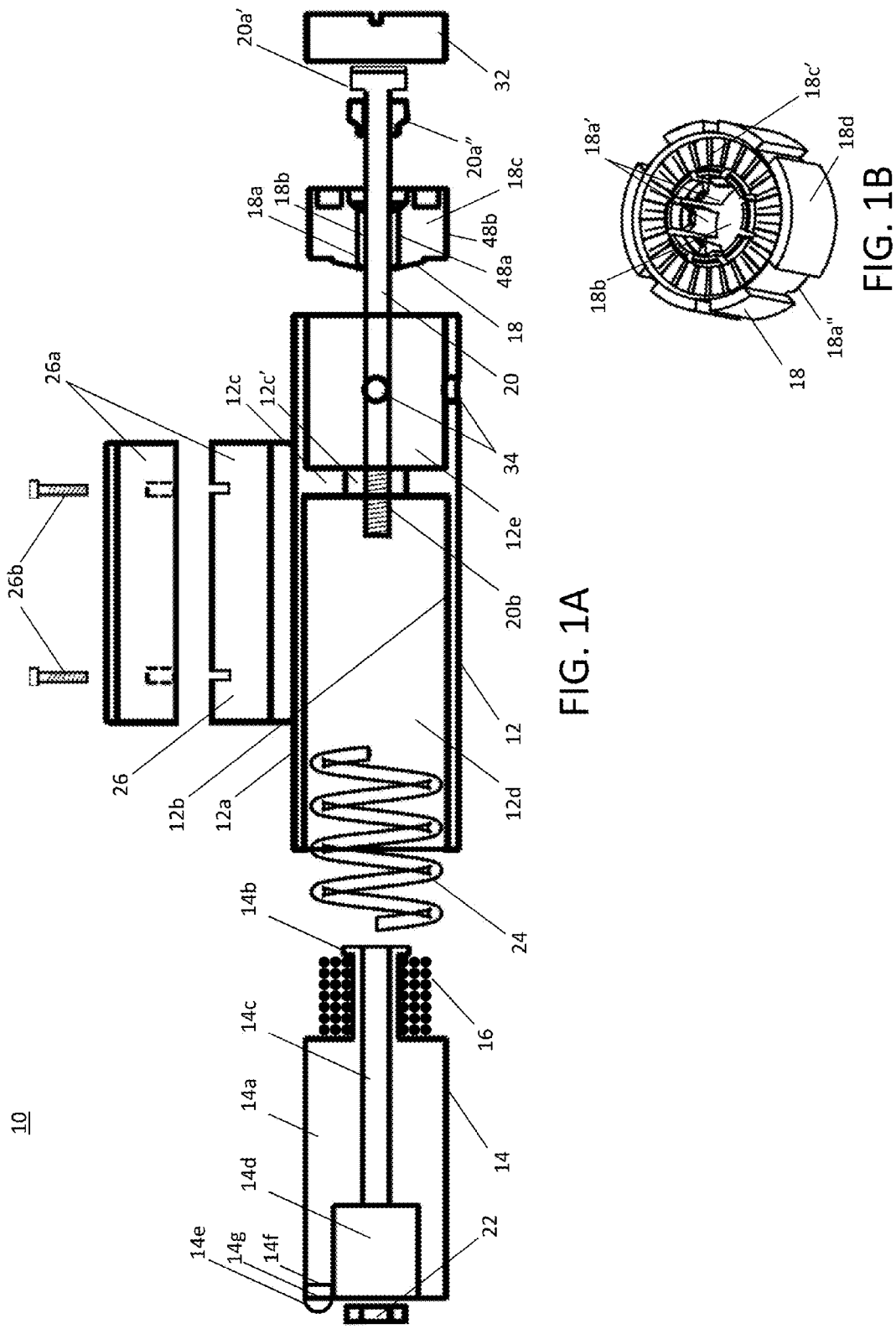

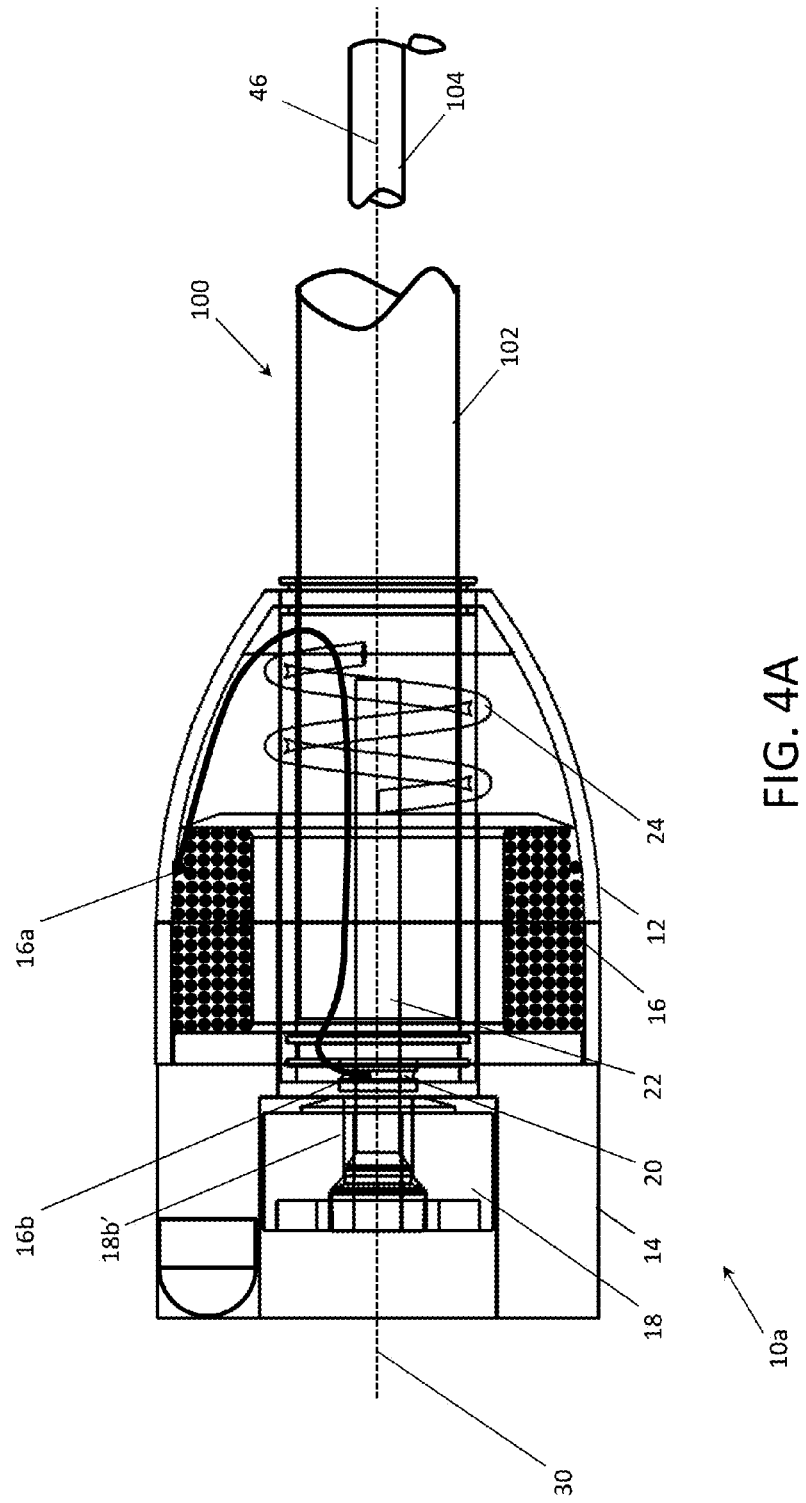

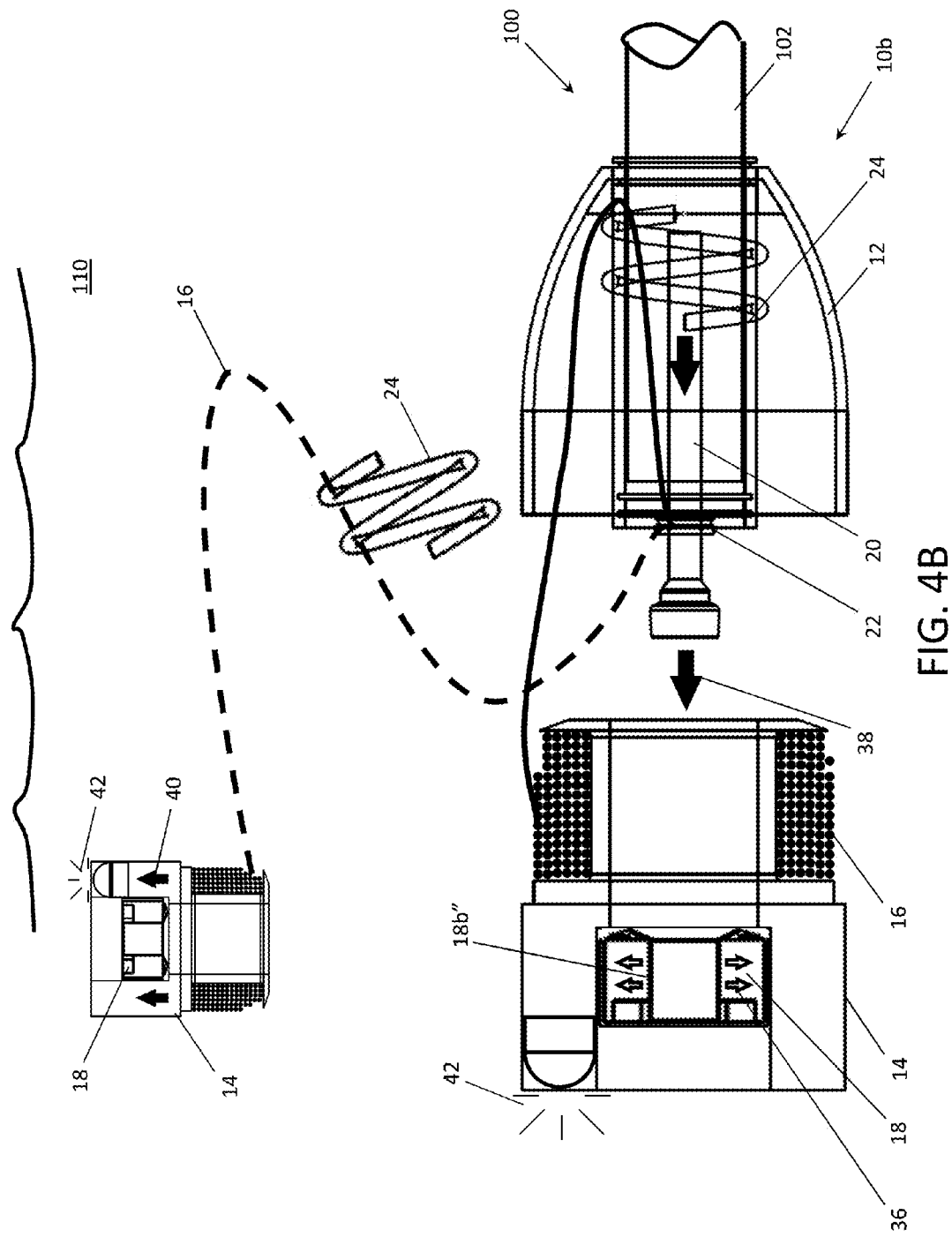

WATER-ACTIVATED BOBBER RELEASE DEVICE

CROSS-REFERENCE TO RELATED APPLICATIONS

This application claims priority from U.S. Provisional Patent Application Nos. 61/869,588 and 62/000,362 respectively filed Aug. 23, 2013 and May 19, 2014 which are hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a device for locating and retrieving a submerged item, and more particularly to reusable water-activated bobber release device for releasing the bobber when the device is exposed to water. The reusable device advantageously minimizes the number of moving parts to allow for quick, easy resetting of the device.

2. Related Art

Existing water-activated bobber release devices are used for releasing a bobber when items, such as fishing rods, rifles or other items become submerged. Traditionally, these devices hold a bobber in place by, in essence, applying a shearing force to a small section of a dissolvable tablet, such that the tablet is under a constant, compressing shear force that seeks to rip the tablet apart at the point of contact. The devices hold the bobber in place by directly opposing the force of the spring by placing the tablet in the way of the bobber's release. This method of operation, however, is prone to inadvertent bobber release, as the tablet breaks down to the constant force and moisture in the ambient atmosphere without the device having been submerged in water. In other words, these devices tend to deploy when the fisherman least wants it to do so, i.e., when the fisherman is reeling in an aggressive fish, while the rod is being transported in a vehicle or when the rod is in storage. The devices that rely on this bobber retention method fail to protect against inadvertent release in the manner used by the present invention, as the present invention instead redirects and redistributes the axial force in a radially outward direction. Additionally, in the prior art devices, the point of contact between the tablet and the opposing structure are necessarily formed of dissimilar materials, with the tablet being formed of salt and the opposing structure being formed from plastic, metal or some other non-dissolving material. Whenever there is a concentrated stress or tension between dissimilar metals, there is the likelihood of increased corrosion and strain which could cause the salt tablet to weaken prematurely. Accordingly, it would be advantageous to avoid concentrations of tension between dissimilar materials.

Other devices that use alternate retention methods, such as salt bobbins, suffer from other serious flaws. These devices utilize a multitude of moving parts positioned deep within their devices, which introduce at least two fatal flaws to those devices. One, moving parts such as internal, rotating metal line reels are subject to rusting when exposed to water. Should enough rust accumulate, the reel stops rotating and does not released any bobber line when submerged. In other words, actual exposure to water prevents the other "water-activated" devices from actually working.

The other fatal flaw is that these deeply-positioned parts, like the internal reel, prevent the fisherman from resetting the device for continued use, short of completely disassembling the device housing. These devices are neither designed nor intended to be resettable and reusable, but are instead intended to be used but a single time. In other words, these devices are different from present invention and teach away from the various aspects of the present invention described below.

Other "non-bobber" devices exist that utilize a salt bobbin to activate some feature(s). For example, some automatically-inflating rafts and jackets use a salt bobbin in their respective automatic inflators to activate when exposed to water. In these examples, a plunger with a piercing needle is held in place by a salt bobbin. When the bobbin is exposed to water, the bobbin expands and releases the plunger, which in turn punctures a compressed gas container to inflate the device. As will be apparent below, these devices are distinctly different in form and function from the present invention.

There remains the need for a reusable water-activated bobber release device which uses a bobbin, minimizes the moving parts and allows a user to quickly reset the device to its ready configuration without any need to disassemble the device housing. Further, it is advantageous to arrange the features in the device in such a manner that the bobber deployment force does not act as a concentrated axial vector that runs directly through the dissolvable tablet and instead is distributed as radial vectors that diverge outwardly from the longitudinal axis through the entire circumference of the dissolvable tablet contained within a bobbin assembly.

SUMMARY OF THE INVENTION

The inventive water-activated bobber release device uses a bobbin assembly to release a bobber assembly from a housing that is attached to a fishing rod when the fishing rod is submerged in water. The bobber assembly includes a bobber, a spool and a central hole, and the bobbin assembly has a framework surrounding a center hole and a dissolvable tablet within the framework. The device also has a spring, a screw, and a fastener. The screw's flared head engages the framework and its elongated threaded section extends through the central hole and the center hole where the fastener connects to the screw to hold the spring in compression when the tablet is solidified. The device also has a line wrapped around the spool connecting the bobber assembly to the housing or the item. When the device is submerged in water, the tablet dissolves, and the spring forces the screw's head through the bobbin assembly, thereby jettisoning the bobber assembly from the housing where it is free to float to the surface for retrieval.

Depending on the particular way in which the bobber release device is mounted to the tool or otherwise incorporated into the tool itself, a different arrangement of the parts can be used. Two exemplary embodiments are described and illustrated to show how the scope of the present invention encompasses the alternative arrangements of the parts. In one embodiment of the bobber release device, the housing can be offset from the fishing rod or other tool to which it is attached through a mounting bracket. In another embodiment, the bobber release device can be aligned with and/or fitted inside the tool. An example of the bobber release device is shown and described as it fits in the butt end of the rod and its longitudinal axis is substantially aligned with the fishing rod's primary axis extending from the butt end to the tip end.

In any embodiment of the present invention, when the bobber release device is exposed to water, the bobbin tablet dissolves or otherwise disintegrates, and is thereafter unable to prevent the framework around the dissolvable tablet from flexing or moving. The spring forces the bobbin assembly and screw apart from each other and jettisons the bobber assembly from the housing. As the bobber assembly separates from the housing, the recovery line unwinds as the bobber floats upward due to its buoyancy. A person searching for the fishing rod can then retrieve the fishing rod by locating the bobber and pulling the rod to the surface.

The bobber release device is reusable and can be reset from the deployed configuration back to the ready configuration. The retrieval line can be wound back onto the spool, and a new bobbin assembly can replace the spent bobbin assembly. The bobber assembly and spring are returned to their places in the housing and the screw and fastener secure the device in its ready position for continued operation.

The described configuration of the housing, spindle mechanism, and bobbin assembly advantageously preserve the physical integrity of the bobbin tablets by protecting the pills from "shearing" forces of the retention element and spring by redirecting the force outward against the fingers of the bobbin assembly. The configuration also minimizes potential "points of failure" by minimizing the number of moving parts, as the only elements that potentially "move" are the bobbin assembly fingers, the spring and bobber once the retention element is released, and the retrieval line that unwinds after the bobber is released.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

FIG. 1A is an exploded view of one embodiment of a water-activated bobber release device according to the present invention;

FIG. 1B is a detail perspective view of a reusable bobbin assembly used in the bobber release device of FIG. 1A.

FIGS. 4A and 4B respectively show the bobber release device of FIG. 3 in an ready configuration and in a deployed configuration.

DETAILED DESCRIPTION OF THE PREFERRED EMBODIMENTS

Figure 2A:
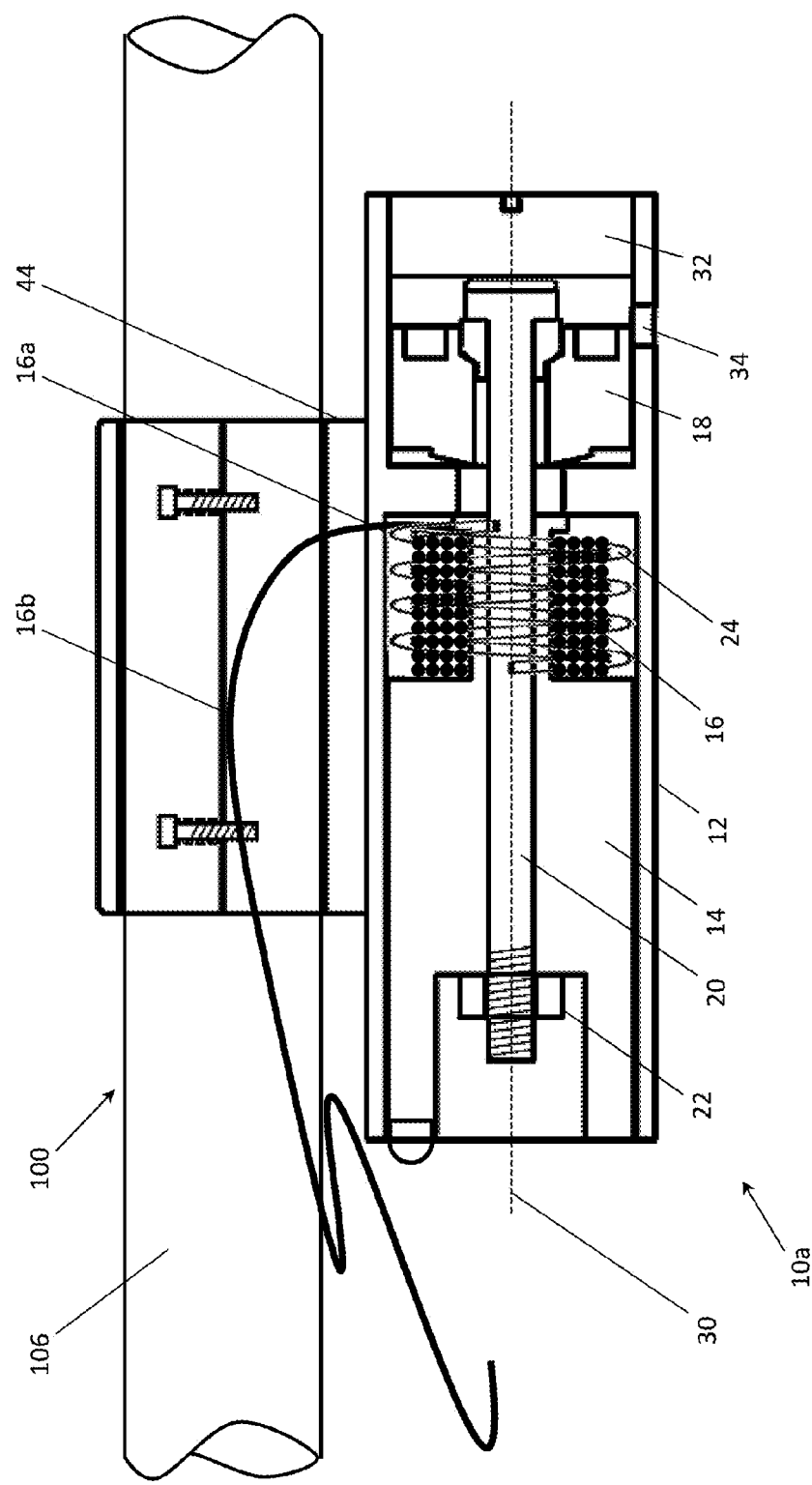
FIGS. 2A and 2B respectively the show the bobber release device of FIG. 1A in an ready configuration and in a deployed configuration.

The following descriptions of the disclosed embodiment(s) are merely exemplary in nature and is in no way intended to limit the invention, its application, or uses. The present invention is a water-activated bobber release device 10 that is attached to a fishing rod 100 or other tool and allows the retrieval of the item when it is submerged in a body of water 110. As shown in the illustrations listed above, the device has a housing 12, a spring 24, a bobber assembly 14 having a bobber 14a, a spool 14b and a central hole 14c, a bobbin assembly 18 having a framework 18a surrounding a center hole 18b and a dissolvable tablet 18c within the framework, a screw 20 having a flared head 20a engaging the framework and an elongated threaded rod section 20b extending through the central hole and the center hole, and a threaded fastener 22 connected to the screw holding the spring in compression when the tablet is solidified 18c'. The device also has a line 16 wrapped around the spool connecting the bobber assembly to the housing or directly to the item. When submerged in water, the tablet dissolves 18c", and the spring supplies a force 38 to push the screw's head through the bobbin assembly, thereby jettisoning the bobber assembly or suitable buoyant device from the housing where it is free to float 40 to the surface of the water body for retrieval.

For example, a fisherman may inadvertently drop the fishing rod 100 into the water. The inventive bobber release device 10 advantageously allows a person to retrieve the fishing rod when it is submerged by locating the bobber 14a that has been jettisoned from the housing and pulling in the recovery line 16 connecting the deployed bobber to the submerged item. As explained in detail below, the bobber release device is reusable, allowing the person to quickly reset the device with a replaceable bobbin assembly 18 and reuse the device.

An exemplary bobber release device 10 is shown in FIGS. 1 and 2. In this embodiment, the device has a housing 12 which is operatively attached to the grip 106 of a fishing rod 100 which can be proximate to the reel assembly/mechanism 108. The bobber release device is attached to the rod by a mounting mechanism, such as a mounting bracket 26 which may be connected by a clamshell or chassis 26a that may be clamped around the rod or secured with screws 26b. It will also be appreciated that the mounting bracket may be attached using straps, zip-ties or other fasteners. The bobber release device is generally attached to the rod at locations that minimally impact the use of the fishing rod for its intended purpose, such as the side of the rod opposite the reel or at the butt end 102 of the rod 100. However, the bobber release device can be attached to the rod at any location that the user finds convenient.

The central hole extends through the bobber assembly and surrounds the longitudinal axis 30 of the bobber assembly. The center hole of the bobbin assembly is axially aligned with the central hole along the longitudinal axis. Also, the elongated threaded rod extends along the longitudinal axis of the bobber assembly. Generally, the various elements that form the bobber release device surround the longitudinal axis, such as the elements described above as well as the spring, housing and fastener.

The housing 12 includes a first open end and a second open end. The interior side 12a of the housing generally comprises a first compartment 12d including the first open end, and a second compartment 12e including the second open end, with a partition 12c or other barrier separating the compartments. The interior of the housing may include additional compartments without departing from the scope of the invention. In an exemplary embodiment, the interior partition 12c is formed by a protrusion of the housing's interior wall extending inward from the wall to form a center opening that is aligned with the center hole and the central hole along the longitudinal axis. In another example, the barrier is formed utilizing a washer or other suitable element. The barrier may also be formed by two or more posts, pegs, or other elements extending inward from the interior wall, so long as a center opening is maintained between the first and second compartments. The housing's exterior side 12b is attached to the mounting bracket 26 which is connected to the fishing rod as described above. The housing also has a hole 34 between the interior and exterior sides that serves as a water inlet channel. The hole is preferably located at a position along the length of the housing which allows the water to enter into the second compartment.

As noted above, the bobber release device also includes a bobber that is deployed when the bobber release device is exposed to water. In order to enable a person to locate the submerged fishing rod, the bobber includes a buoy or some otherwise buoyant material that brings the bobber to the top of the water once deployed. In one exemplary embodiment, the bobber includes a retention element that, when used in conjunction with other aspects of the device, retains the bobber in the housing prior to being jettisoned. In another embodiment, the bobber includes a tube extending through the center of the bobber for accepting a screw. The center tube may be formed through the buoy or the buoyant material itself, or the center tube may be formed from a different material or structure, such as a hard plastic, with the buoy or buoyant material secured around the tube. Once the screw passes into the center tube and through the bobber, a washer and nut secure the screw, allowing the screw to act as a retention element. Those of ordinary skill in the art will recognize that other items may be used as a retention element, channel and/or tube without departing from the scope of this invention. Regardless of its form, the retention element extends a sufficient distance to extend from the first compartment of the housing, through the center opening, and into the second compartment (or vice versa) for the retention element to be engaged, as described below with respect to the bobbin assembly.

In one embodiment, the washer and screw fit into a recessed cavity 14d at or near the end of the center tube. The cavity may optionally be formed to hold the washer and nut stationary, such that once the threaded end of the screw is engaged, the washer and nut are held in place while the screw turns. In other words, the cavity permits "self-tightening" operation to secure the retention element.

As indicated above, in the embodiment shown in FIGS. 1 and 2, the bobber release device 100 preferably includes a spring 24 positioned between the bobber and the partition in the first compartment. Although the spring is illustrated as a helical spring, any compressible material that acts in a similar manner may be used without departing from the scope of the present invention. The recovery line 16 is attached between the bobber and the housing and includes, but is not limited to, monofilament line, string, wire, or cable. In one embodiment, the recovery line attaches to the bobber assembly 16a at one end, passes through the interior of the spring along its longitudinal axis, and attaches to the housing or the rod at the other end 16b. According to an aspect of the device, the bobber includes a retrieval line retaining element disposed on or around the bobber, the retention element, or both. The retrieval line is wound around the spool 14b.

The second compartment includes the bobbin assembly 18 positioned therein to engage the retention device and hold the bobber against the compressed spring. In a preferred embodiment of the device, the bobbin assembly includes a center section 18a which preferably has longitudinal fingers 18a' radially spaced around the longitudinal axis and positioned parallel to an outside wall 18d as particularly shown in FIG. 1B. Each one of the fingers preferably has a base section 18a" that extends radially outward and connects to the outer wall. A bobbin dissolvable tablet, such as a salt tablet or pill, with a center hole is positioned between the outer wall 18d and the longitudinal fingers to retain the fingers in their longitudinal position. In the preferred embodiments, the bobbin assembly is generally cylindrical in shape and the solid bobbin tablet 18c' is annular in shape with an inner annular surface 48a and an outer annular surface 48b between the longitudinal fingers 18a' and the outer wall 18d, respectively. In the embodiments shown in the drawings, the bobbin assembly is a HALKEY-ROBERTS V80040 Super Bobbin as described by U.S. Pat. No. 6,705,488 which is incorporated by reference herein. It will also be appreciated that the bobbin assembly and dissolvable tablet may be formed in other shapes that have a framework with a radially-expandable center hole 18b which transitions from a narrow hole 18b' with a smaller diameter than the flared head of the screw when the dissolvable tablet its solidified form to an expanded hole 18b" with a diameter that expands to at least the diameter of the flared head when the dissolvable tablet transitions to a dissolved state.

While the dissolvable tablet remains in its solid form, the longitudinal fingers are retained in their parallel position, and the tips of the fingers form a seat for engaging the retention element, e.g., the grommet threaded onto the screw, the head of the screw, etc., and holding the bobber in place against the force of the spring. The bobbin assembly's seat "redirects" the axial force 38 of the spring into a expansive force 36 pushing radially outward against the fingers and the dissolvable tablet. From the perspective of the dissolvable tablet 18c, the outward force is compressive, pushing the tablet against the outer wall. By holding the salt pill or other dissolvable tablet within the bobbin housing, there is no concentration of the spring force through a particular region of the tablet and the primary loading between the spring force through the bobbin can be made through materials with similar structural properties. The bobbin housing distributes the force radially around the entire circumference of the tablet rather than concentrating the spring force directly through only one section of the tablet. Accordingly, it will be appreciated that other bobbin assemblies could also be used, such as the design described by U.S. Pat. No. 4,260,075 which is also incorporated by reference herein.

As shown in FIG. 2A, the bobber release device is placed into a ready configuration 10a, i.e., an "armed-and-ready" state, by winding the retrieval line around the spool and inserting the bobber into the first compartment, with the spring positioned between the bobber and the barrier, putting the spring into a compressed state. For the purposes of this example and as illustrated in FIGS. 1 and 2, a screw with a grommet threaded thereon acts as the retention element. When placing the bobber release device into its ready state, the threaded end of the screw passes through the center hole of the bobbin, through the center opening of the barrier, through the bobber via the center tube, where a washer and screw secure the screw. An end cap 32 is then disposed around the second open end of the housing, enclosing the second compartment. This configuration of elements is referred to as the "ready state" of the bobber release device.

Figure 2B:
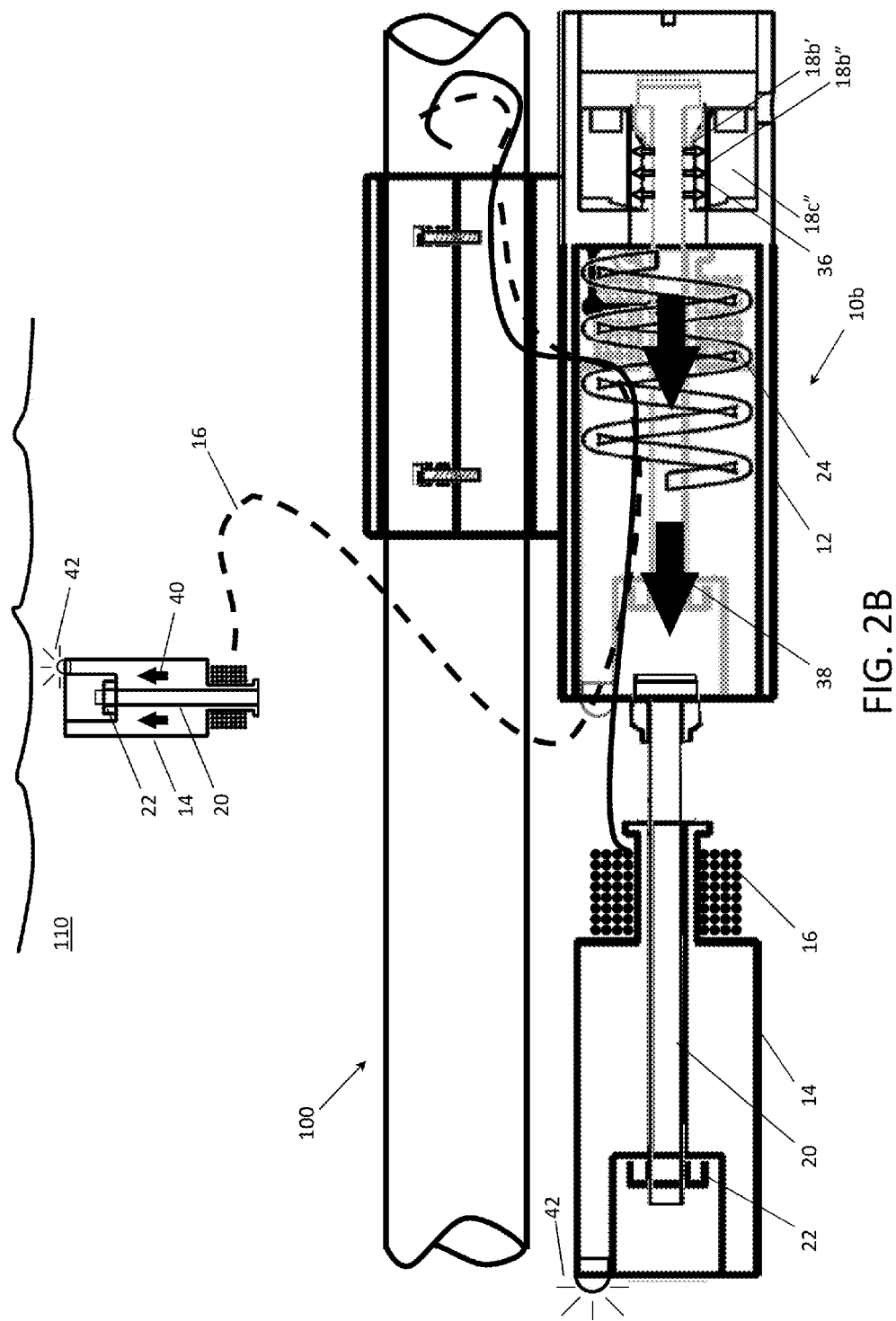

In the event that the device is submerged, water enters the second compartment and the bobbin tablet is exposed to the water, at which point the tablet begins to dissolve or otherwise disintegrate as designed. In this dissolved/disintegrated state, the tablet is unable to prevent the fingers from flexing or moving. The longitudinal fingers of the bobbin device then begin to flex and/or move radially outward under the axial force of the spring acting on the retention element, thereby expanding 36 the bobbin assembly's center section 18a. The bobber then moves from its first, interior position to a second position outside the housing, e.g., the bobber is then ejected from the second compartment to the exterior of the housing by the spring. The deployed configuration 10b of the device is illustrated in FIG. 2B. Once the bobber release device enters its deployed state, the bobber separates from the housing and the recovery line unwinds from the spool as the bobber floats upward 40 due to its buoyancy. Once the bobber reaches the surface of the water, a person searching for the fishing rod retrieves the fishing rod by locating the bobber and pulling the rod to the surface. Advantageously, the person may then wind the retrieval line back onto the spool and quickly reassemble the bobber release device back into its ready state for continued operation, due to the combination of elements described above.

The described configuration of the housing, bobber assembly, and bobbin assembly advantageously preserve the physical integrity of the dissolvable tablets by redirecting the "shearing" forces of the retention element radially outward against the fingers of the bobbin assembly. And by way of minimizing the number of moving parts, the bobber release device is quickly resettable and reusable, unlike those devices described in the prior art above. Also, to help in visually locating the deployed bobber, particularly at night, the bobber may include a water-resistant, solid state light element 14e, such as an LED that is connected to a battery 14f which is activated 42 when the bobber is deployed. There are a number of ways to activate the circuit between the LED and battery. For example, there may be a nonconductive sheet 14g or film between the leads connecting the LED to the battery, and when the film is removed, the circuit between the LED and the battery is closed. One end of the film may be connected to the housing so that it is pulled away when the bobber is deployed, thereby activating the circuit. Alternatively, the film may be water soluble so that it dissolves when the device is submerged, thereby activating the circuit. It is also possible for an annular ring or catch within the housing to engage a switch mechanism on the bobber as it is ejected from the housing to activate the circuit. The battery can be a replaceable item or the entire light assembly may be replaceable after the device is submerged and the bobber assembly is deployed.

The retrieval line 16 passes through and extends outside the housing. In this embodiment, the person operating the fishing rod with the selects where to attach the second end of the retrieval line. For example, the person may attach the second end to the housing or to the rod itself. It is possible to connect the second end of the retrieval line to the housing and with an end segment that is long enough to also connect to the rod.

The interior face of the end cap 32 may include a screwdriver which allows the retention element to be engaged and the bobber release device to be quickly loaded. As noted above, the bobber assembly may optionally include a recessed cavity that permits "self-tightening". This combination of elements advantageously permits the person to quickly reset and reuse the bobber release device without the need for extra tools.

Figure 3:
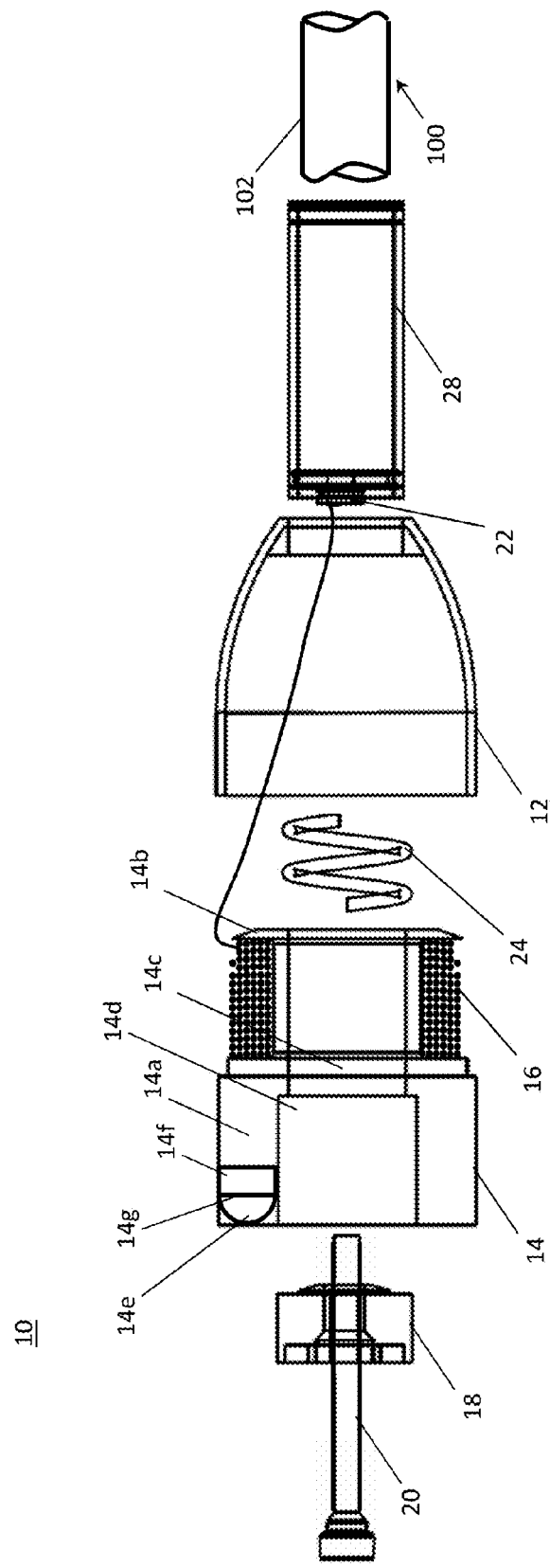
FIG. 3 is an exploded view of another embodiment of a water-activated bobber release device according to the present invention.

An alternative embodiment of the bobber release device 10 according to the present invention is shown in FIGS. 3-5 and illustrates a different arrangement of the parts in the water-activated bobber release device 10. In this embodiment, the device 10 fits in the butt end 102 of the rod 100 and the longitudinal axis 30 of the bobber assembly 14 and the device is substantially aligned with the fishing rod's primary axis 46 extending from the butt end 102 to the tip end 104. The alternative arrangement of parts could also be used for a bobber release device that is offset from the tool, such as the device described above and illustrated in FIGS. 1-2 in which the longitudinal axis of the device is substantially parallel to the rod's primary axis, although it is preferably incorporated into the base end of a rod or with a handle or other extension to a grip in any other tool. In this arrangement, a cylindrical sleeve 28 extends over the base end of the rod and is preferably connected to the rod by glue or an epoxy. Of course, it will be appreciated that the housing 12 could be formed as a part of the tool with the other parts of the bobber release device fitting within the housing, or the housing can be a separate construction which is attached to the tool.

The cap of the sleeve has a threaded central hole 22 or has a threaded nut fixed within the center of the sleeve. Generally, the threaded hole or nut is a threaded fastener for the screw. The bobber and spool assembly 14 with the line 16 is held to the sleeve by a screw 20 extending through the bobbin assembly 18. The salt bobbin preferably fits within a recess 14d in the bobber 14, and the screw extends through the central opening of the salt bobbin and screws into the threaded cap of the sleeve. The screw has a flared head and/or grommet which engages the center portion of the salt bobbin, and the flared head is wider than the central opening of the salt bobbin when the salt bobbin is solidified. The screw pulls the bobber and spool assembly toward the sleeve and compresses a spring that fits between the side of the sleeve that is opposite the threaded central hole and the side of the bobber and spool assembly that is opposite the recess. The line extends from the spool and is attached to the rod or the sleeve, and a housing 12 preferably covers the sleeve, spring and spool with the line and abuts the bobber.

If the rod, firearm or other tool is dropped into water, the salt tablet in the salt bobbin dissolves within the bobbin framework. As the salt dissolves, the bobbin framework loses the structural foundation that the solidified salt tablet had provided, and the potential energy in the compressed spring ultimately overcomes the weakening foundation and pushes the spool assembly and the salt bobbin past the flared head of the screw, freeing the bobber assembly from its connection to the housing. Similar to the embodiment described above with reference to FIGS. 1-2, the potential energy of the compression spring is countered by the flared head of the screw engaged with the bobbin framework around the central hole. Accordingly, the potential energy of the screw is transferred through the bobbin framework to the salt tablet and is distributed radially through the entire circumference of the salt tablet. As the salt tablet dissolves within the salt bobbin, its support to the bobbin framework weakens and ultimately spreads radially outward as the spring forces the bobbin past the flared head of the screw and frees the spool assembly with the line.

Figure 5A:
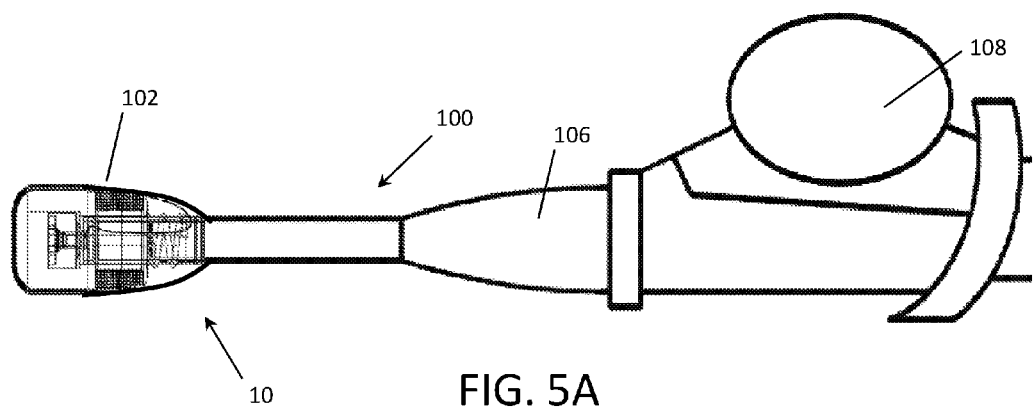
FIGS. 5A-5C show the bobber release device of FIG. 3 incorporated into rod handles.
Figure 5B:
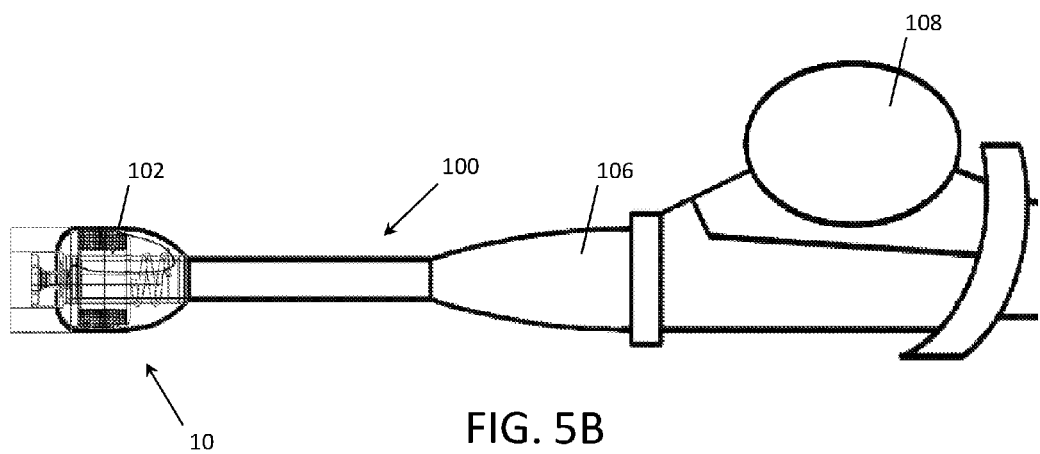
Figure 5C:
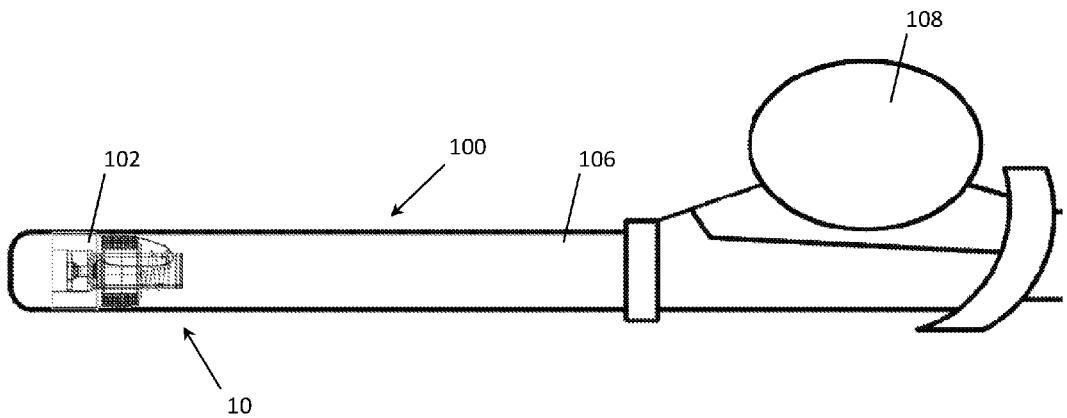

It will be appreciated that the sleeve can be made in different inner diameters to fit over different sized rods and other grips. Similarly, the housing that extends from the sleeve over the spool assembly and mates with the bobber can have different contours and shapes to correspond with various rod handles and other grips. For example, the housing may be squared off to fit up against cork handled rods and made slimmer to mimic longer skinnier rod handles. Generally, the housing provides a shield for the line and the spring which protects them from weather and the elements. It will also be appreciated that the water-activated bobber release device can be attached the end of a rod or other grip using the sleeve as shown in FIGS. 3, 4 and 5A or may incorporated directly into the rod as shown in FIGS. 5B and 5C.

It should be noted that, while this application describes water as the activating agent for the release device, any liquid capable of sufficiently dissolving or weakening the bobbin assembly/salt bobbin is within the scope of this invention. Furthermore, one of ordinary skill in the art would recognize that, while the above-described embodiments relate to a device, one or more systems or one or more methods describing the elements, functions, and operations remain within the scope of this invention. When the bobber assembly is jettisoned or otherwise ejected from the housing, the spring may also be ejected as shown in FIG. 4B. Alternatively, as shown in FIG. 2B, the spring may be connected to the housing at the end facing the interior side of the housing, opposite from the end facing bobber assembly, so that when the bobber assembly is jettisoned from the housing, the spring is retained within the housing. In either arrangement, the line may be threaded through the spring so that in the event that the spring does become dislodged from the housing upon deployment of the bobber assembly, the spring is held on the line as the rod is retrieved.

The present invention is particularly described as it may be mounted, attached or otherwise formed as a part of a fishing rod. As indicated above, the bobber release device 10 may be mounted or attached to any item of value that might be used in or around water, such as a tackle box, rifle, shotgun, or any other tool. When connected to a fishing rod, the device may also include a line cutter 44.

The embodiments explain the principles of the invention and its practical application. Modifications could be made to the exemplary embodiments described above with reference to the corresponding illustrations without departing from the scope of the invention. Accordingly, all matter contained in the foregoing description and shown in the accompanying drawings shall be interpreted as illustrative rather than limiting. For example, although the bobbin assemblies shown in the drawings and described above all include a framework around the tablet, it is possible to use a dissolvable tablet with a center hole without any framework around it. The assembly may have center fingers or a center sheath to engage with the screw's flared head, or it may all be dissolvable. Thus, the breadth and scope of the present invention should not be limited by any of the above-described exemplary embodiments, but should be defined only in accordance with the following claims appended hereto and their equivalents.

What is claimed is:

1. A water-activated bobber release device for a tool, comprising:
   a housing connected to the tool;
   a bobber assembly comprising a bobber, a spool fixedly attached to said bobber and a central hole surrounding a longitudinal axis of said bobber assembly, wherein said spool fits within said housing in a ready configuration and is jettisoned away from said housing in a deployed configuration, wherein said bobber is at one end of said bobber assembly and said spool is at an opposite end of said bobber assembly and wherein said central hole extends through said bobber and said spool along said longitudinal axis;
   a line wrapped around said spool and connected to said bobber assembly at a first end and connected to at least one of said housing and the tool at a second end;
   a bobbin assembly comprised of a center section surrounding a center hole and a dissolvable tablet circumferentially surrounding said center section, wherein said center hole is axially aligned with said central hole of said bobber assembly along said longitudinal axis;
   a screw extending through said center hole and said central hole, wherein said screw comprises a flared head and an elongated threaded rod extending along said longitudinal axis of said bobber assembly, wherein said flared head engages said center section at a first side of said bobbin assembly, and wherein said flared head is larger than said center hole when said dissolvable tablet is in a solidified form;
   a threaded fastener axially aligned with said central hole of said bobber assembly and said center hole of said bobbin assembly, wherein said threaded fastener engages said elongated threaded rod; and
   a spring compressed within said housing by said screw and said threaded fastener when said bobbin assembly is in said solidified form; and
   wherein said center section and said center hole of said bobbin assembly are respectively comprised of a framework with a radially-expandable center hole, wherein said framework is distributed circumferentially around said radially-expandable center hole and is positioned between said flared head and said dissolvable tablet, wherein said solidified form of said dissolvable tablet supports said framework to maintain a first diameter of said radially-expandable center hole, wherein said first diameter is smaller than said flared head, wherein a dissolved state of said dissolvable tablet fails to support said framework and said flared head pushes said framework radially outward expanding said radially-expandable center hole to a second diameter, therein said second diameter is at least as large as said flared head.

2. The bobber release device of claim 1, wherein said solidified form of said dissolvable tablet keeps said spring compressed in said ready configuration and wherein said dissolved state of said dissolvable tablet allows said spring to force said bobber assembly into said deployed configuration, wherein said bobber fits within said housing with said spool in said ready configuration and is jettisoned away from said housing with said spool in said deployed configuration.

3. The bobber release device of claim 2, wherein said spring forces a relative movement of said flared head through said center section from said first side and out of a second side when said dissolvable tablet transitions from said solidified form to said dissolved state.

4. The bobber release device of claim 1, wherein said center section further comprises a plurality of longitudinally extending fingers spaced radially around said center hole and said bobbin assembly further comprises an outer wall circumferentially surrounding said dissolvable tablet, wherein a base section of each of said fingers extends radially outward and connects to said outer wall, and wherein said spring forces said flared head to move said fingers outward towards said outer wall and expand said center hole when said dissolvable tablet transitions from said solidified form to said dissolved state.

5. The bobber release device of claim 1, wherein said bobber assembly further comprises a light, a battery and a recessed cavity in said bobber, wherein at least one of said bobbin assembly and said threaded fastener are contained within said recessed cavity, wherein said light is connected to said battery, and wherein said battery is activated in said deployed configuration.

6. The bobber release device of claim 1, wherein said housing is further comprised of an interior side, an exterior side, a first end, a second end, an interior partition between said first end and said second end, a cap covering said second end and at least one hole in said second end extending from said interior side to said exterior side, wherein said interior partition separates a first compartment and a second compartment, wherein said bobber assembly is located at said first end in said first compartment and said spring is situated between said bobber assembly and a first side of said interior partition, wherein said bobbin assembly is located in said second compartment between said cap and a second side of said interior partition, wherein said interior partition comprises a center opening aligned with said center hole, said central hole and said longitudinal axis, and wherein said screw extends between said first compartment and said second compartment through said center opening in said interior partition.

7. The bobber release device of claim 6, further comprising a mounting bracket holding said housing to the tool.

8. The bobber release device of claim 1, wherein said housing is further comprised of an interior side, an exterior side, an open end, and a closed end, wherein said spring and said threaded fastener are situated between said bobber assembly and said closed end, and wherein said bobbin assembly is situated at a side of said bobber assembly at said open end of said housing.

9. The bobber release device of claim 8, further comprising a sleeve connected to said closed end of said housing, wherein said threaded fastener is attached to said sleeve, and wherein said sleeve is mounted to a grip of the tool.

10. The bobber release device of claim 9, wherein said grip is proximate to a butt end of a fishing rod.

11. The bobber release device of claim 1, wherein said bobber assembly has a reset configuration substantially identical to said ready configuration, wherein said reset configuration is produced after said deployed configuration, wherein said bobbin assembly is comprised of a first bobbin assembly in said ready configuration, and wherein said bobbin assembly is comprised of a second bobbin assembly in reset configuration.

12. A water-activated bobber release device for a tool, comprising:
a housing;
a means for connecting said housing to the tool;
a bobber assembly comprising a bobber, a spool fixedly attached to said bobber and a central hole surrounding a longitudinal axis of said bobber assembly, wherein said bobber assembly fits within said housing in a ready configuration and is jettisoned away from said housing in a deployed configuration, wherein said bobber is at one end of said bobber assembly and said spool is at an opposite end of said bobber assembly, and wherein said central hole extends through said bobber and said spool along said longitudinal axis;
a line wrapped around said spool and connected to said bobber assembly at a first end and connected to at least one of said housing and the tool at a second end;
a bobbin assembly comprised of a center hole, a plurality of longitudinally extending fingers spaced radially around said center hole, a dissolvable tablet circumferentially surrounding said fingers, and an outer wall circumferentially surrounding said dissolvable tablet, wherein a base section of each of said fingers extends radially outward and connects to said outer wall, and wherein said center hole is axially aligned with said central hole of said bobber assembly along said longitudinal axis;
a screw extending through said center hole and said central hole, wherein said screw comprises a flared head and an elongated threaded rod extending along said longitudinal axis of said bobber assembly, wherein said flared head engages said center section at a first side of said bobbin assembly, and wherein said flared head is larger than said center hole when said dissolvable tablet is in a solidified form;
a threaded fastener axially aligned with said central hole of said bobber assembly and said center hole of said bobbin assembly, wherein said threaded fastener engages said elongated threaded rod; and
a spring compressed within said housing by said screw and said threaded fastener when said bobbin assembly is in said solidified form, wherein a dissolved state of said dissolvable tablet allows said spring to force said bobber assembly into said deployed configuration, wherein said spring forces said flared head to move said fingers outward towards said outer wall and expand said center hole when said dissolvable tablet transitions from said solidified form to said dissolved state, and wherein said spring forces a relative movement of said flared head through said center section from said first side and out of a second side when said dissolvable tablet transitions from said solidified form to said dissolved state.

13. The bobber release device of claim 12, wherein said bobber assembly further comprises a recessed cavity in said bobber and wherein at least one of said bobbin assembly and said threaded fastener are contained within said recessed cavity.

14. The bobber release device of claim 12, wherein said connecting means is a mounting bracket attaching said housing to the tool, wherein said housing is further comprised of an interior side, an exterior side, a first end, a second end, an interior partition between said first end and said second end, a cap covering said second end and at least one hole in said second end extending from said interior side to said exterior side, wherein said interior partition separates a first compartment and a second compartment, wherein said bobber assembly is located at said first end in said first compartment and said spring is situated between said bobber assembly and a first side of said interior partition, wherein said bobbin assembly is located in said second compartment between said cap and a second side of said interior partition, wherein said interior partition comprises a center opening aligned with said center hole, said central hole and said longitudinal axis, and wherein said screw extends between said first compartment and said second compartment through said center opening in said interior partition.

15. The bobber release device of claim 12, wherein said connecting means is a sleeve attaching said housing to the tool, wherein said threaded fastener is attached to said sleeve, wherein said housing is further comprised of an interior side, an exterior side, an open end, and a closed end, wherein said spring and said threaded fastener are situated between said bobber assembly and said closed end, wherein said bobbin assembly is situated at a side of said bobber assembly at said open end of said housing, and wherein said sleeve is connected to said housing at said closed end.

16. A water-activated bobber release device for retrieving a submerged item, comprising:
- a fishing rod having a tip end, a butt end and a grip section between said tip end and said butt end;
- a housing connected said fishing rod;
- a bobber assembly comprising a bobber, a spool fixedly attached to said bobber and a central hole surrounding a longitudinal axis of said bobber assembly, wherein said spool fits within said housing in a ready configuration and is jettisoned away from said housing in a deployed configuration, wherein said bobber is at one end of said bobber assembly and said spool is at an opposite end of said bobber assembly and wherein said central hole extends through said bobber and said spool along said longitudinal axis;
- a line wrapped around said spool and connected to said bobber assembly at a first end and connected to at least one of said housing and the tool at a second end;
- a bobbin assembly comprised of a framework surrounding a center hole in a center section and a dissolvable tablet within said framework, wherein said center hole is axially aligned with said central hole of said bobber assembly along said longitudinal axis;
- a screw extending through said center hole and said central hole, wherein said screw comprises a flared head and an elongated threaded rod extending along said longitudinal axis of said bobber assembly, wherein said flared head engages said center section at a first side of said bobbin assembly, and wherein said flared head is larger than said center hole when said dissolvable tablet is in a solidified form;
- a threaded fastener axially aligned with said central hole of said bobber assembly and said center hole of said bobbin assembly, wherein said threaded fastener engages said elongated threaded rod; and
- a spring compressed within said housing by said screw and said threaded fastener when said bobbin assembly is in said solidified form; and
- wherein said center section and said center hole of said bobbin assembly are respectively comprised of said framework with a radially-expandable center hole, wherein said framework is distributed circumferentially around said radially-expandable center hole and is positioned between said flared head and said dissolvable tablet, wherein said solidified form of said dissolvable tablet supports said framework to maintain a first diameter of said radially-expandable center hole, wherein said first diameter is smaller than said flared head, wherein a dissolved state of said dissolvable tablet fails to support said framework and said flared head pushes said framework radially outward expanding said radially-expandable center hole to a second diameter, wherein said second diameter is at least as large as said flared head.

17. The bobber release device of claim 16, wherein said solidified form of said dissolvable tablet keeps said spring compressed in said ready configuration and wherein said dissolved state of said dissolvable tablet allows said spring to force said bobber assembly into said deployed configuration, wherein said bobber fits within said housing with said spool in said ready configuration and is jettisoned away from said housing with said spool in said deployed configuration.

18. The bobber release device of claim 17, wherein said framework is comprised of a plurality of fingers spaced radially around said center hole, wherein said spring forces said flared head to move said fingers outward away from said center hole and to expand said center hole when said dissolvable tablet transitions from said solidified form to said dissolved state, and wherein said housing is connected to said fishing pole through at least one of a mounting bracket fixed to said fishing pole proximate to said grip section and a sleeve fixed to said fishing pole proximate to said butt end.

19. The bobber release device of claim 18, wherein said framework further comprises an outer wall circumferentially surrounding said dissolvable tablet, wherein each of said fingers comprises a longitudinally extending segment connected to a base section, and wherein said base section extends radially outward and connects to said outer wall.

20. A water-activated bobber release device for retrieving a submerged item, comprising:
- a fishing rod having a tip end, a butt end and a grip section between said tip end and said butt end;
- a housing connected said fishing rod, wherein said housing comprises an interior side, an exterior side, a proximal end, and a distal end, wherein said proximal end of said housing is connected to said butt end of said fishing rod;
- a bobber assembly comprising a bobber, a spool fixedly attached to said bobber and a central hole surrounding a longitudinal axis of said bobber assembly, wherein said spool fits within said housing in a ready configuration and is jettisoned away from said housing in a deployed configuration, wherein said bobber is at one end of said bobber assembly and said spool is at an opposite end of said bobber assembly and wherein said central hole extends through said bobber and said spool along said longitudinal axis;
- a line wrapped around said spool and connected to said bobber assembly at a first end and connected to said housing at a second end;
- a bobbin assembly comprised of a framework surrounding a radially-expandable center hole in a center section and a dissolvable tablet within said framework, wherein said radially-expandable center hole is axially aligned with said central hole of said bobber assembly along said longitudinal axis, and wherein said framework is distributed circumferentially around said radially-expandable center hole;
- a spring positioned between said bobber assembly and said housing; and
- a means for holding said spring in a compressed arrangement between said bobbin assembly and said interior side of said housing as said proximal end when said dissolvable tablet is in a solidified form and releasing said spring to an expanded arrangement when said dissolvable tablet transitions to a dissolved state, wherein said holding means contains said central hole of said bobber assembly between said bobbin assembly and said spring, and wherein said compressed arrangement corresponds with said ready configuration and said expanded arrangement corresponds with said deployed configuration; and
- wherein said framework has a first position in contact with said dissolvable tablet in said solidified form, wherein said framework has a first diameter of said radially-expandable center hole in said first position, wherein said framework moves radially outward to a second position when said dissolvable tablet is in said dissolved state, wherein said framework has a second diameter of said radially-expandable center hole in said second position, wherein said second diameter is greater than said first diameter.

21. The bobber release device of claim 20, wherein said holding means comprises a screw and a threaded fastener, wherein said threaded fastener is attached to said housing at said proximal end, wherein said screw extends through said radially-expandable center hole and said central hole, wherein said screw comprises a flared head and an elongated threaded rod extending along said longitudinal axis of said bobber assembly, wherein said flared head engages said center section at a first side of said bobbin assembly, wherein said threaded fastener is axially aligned with said central hole of said bobber assembly and said radially-expandable center hole of said bobbin assembly, wherein said threaded fastener engages said elongated threaded rod, wherein said flared head is larger than said radially-expandable center hole when said dissolvable tablet is in said solidified form, wherein said spring forces said flared head to expand said framework around said radially-expandable center hole and pushes said bobbin assembly past said flared head and jettisons said bobber assembly away from said housing in said deployed configuration when said dissolvable tablet transitions from said solidified form to said dissolved state.

22. The bobber release device of claim 20, wherein said framework is comprised of a plurality of fingers and an outer wall, wherein said fingers are spaced radially around an inner annular surface of said dissolvable tablet and said outer wall circumferentially surrounds said an outer annular surface of said dissolvable tablet, wherein each of said fingers comprises a longitudinally extending segment connected to a base section, wherein said base section extends radially outward and connects to said outer wall, and wherein said spring forces said flared head to move said fingers outward away from said radially-expandable center hole toward said outer wall to expand said radially-expandable center hole when said dissolvable tablet transitions from said solidified form to said dissolved state and said bobbin assembly moves past said flared head of said screw.

* * * * *